United States Patent
Son et al.

(10) Patent No.: US 9,739,957 B2
(45) Date of Patent: Aug. 22, 2017

(54) OPTICAL TRANSMISSION AND RECEIVING DEVICE FOR IMPLEMENTING PASSIVE ALIGNMENT OF COMPONENTS AND METHOD FOR PASSIVELY ALIGNING COMPONENTS

(71) Applicant: UNIVE CO., LTD, Seongnam-si, Gyeonggi-do (KR)

(72) Inventors: Yung Sung Son, Calgary (CA); Sang-Shin Lee, Seoul (KR); Hak-Soon Lee, Pocheon-si (KR); Jun-Young Park, Seoul (KR)

(73) Assignee: UNIVE CO., LTD., Seongnam-Si (KR)

( * ) Notice: Subject to any disclaimer, the term of this patent is extended or adjusted under 35 U.S.C. 154(b) by 0 days.

(21) Appl. No.: 15/002,305

(22) Filed: Jan. 20, 2016

(65) Prior Publication Data
US 2016/0246014 A1  Aug. 25, 2016

Related U.S. Application Data

(62) Division of application No. 14/788,547, filed on Jun. 30, 2015, which is a division of application No.
(Continued)

(30) Foreign Application Priority Data

Sep. 17, 2010  (KR) .................. 10-2010-0091614

(51) Int. Cl.
*G02B 6/42* (2006.01)
*G02B 6/26* (2006.01)
(Continued)

(52) U.S. Cl.
CPC ............. *G02B 6/423* (2013.01); *G02B 6/26* (2013.01); *G02B 6/32* (2013.01); *G02B 6/34* (2013.01);
(Continued)

(58) Field of Classification Search
CPC ....................................................... G02B 6/42
(Continued)

(56) References Cited

U.S. PATENT DOCUMENTS 4,877,301 A * 10/1989 Yokomori et al. .............. 385/37
5,500,523 A *  3/1996 Hamanaka .................... 250/216
(Continued)

FOREIGN PATENT DOCUMENTS

KR  20030071425 A  9/2003
KR  20050079888 A  8/2005
(Continued)

OTHER PUBLICATIONS

English Translation of Korean Registration No. 1011769500000, dated Aug. 20, 2012.
(Continued)

*Primary Examiner* — Kaveh C Kianni
(74) *Attorney, Agent, or Firm* — Arent Fox LLP

(57) ABSTRACT

An optical device for implementing passive alignment of parts and a method therefor, more particularly an optical device and a method therefor that utilize an alignment reference part arranged on the substrate to passively align an optical element part with a lens-optical fiber connection part. For the passive alignment of parts, connection pillars of an alignment reference part are coupled to substrate holes, one or more light-emitting elements and one or more light-receiving elements are aligned in a row in a particular interval with respect to alignment holes arranged opposite each other in the alignment reference part, a lens-optical fiber connection part is aligned with respect to the alignment holes, and an optical fiber is aligned with the optical alignment point at a surface of a prism forming a portion of the lens-optical fiber connection part.

14 Claims, 9 Drawing Sheets

Related U.S. Application Data

13/512,478, filed as application No. PCT/KR2011/006902 on Sep. 19, 2011, now Pat. No. 9,103,984.

(51) Int. Cl.
*G02B 6/32* (2006.01)
*G02B 6/34* (2006.01)

(52) U.S. Cl.
CPC ............ *G02B 6/424* (2013.01); *G02B 6/425* (2013.01); *G02B 6/4206* (2013.01); *G02B 6/4214* (2013.01); *G02B 6/4231* (2013.01); *G02B 6/4239* (2013.01); *G02B 6/4243* (2013.01); *G02B 6/4244* (2013.01); *G02B 6/4245* (2013.01); *G02B 6/4257* (2013.01); *G02B 6/4249* (2013.01); *G02B 6/4277* (2013.01); *Y10T 29/49895* (2015.01)

(58) Field of Classification Search
USPC .......................................................... 385/33
See application file for complete search history.

(56) References Cited

U.S. PATENT DOCUMENTS

| | | | |
|---|---|---|---|
| 6,205,274 B1* | 3/2001 | Zhou ................................ | 385/38 |
| 6,241,399 B1* | 6/2001 | Nobuhara ....................... | 385/84 |
| 6,491,447 B2 | 12/2002 | Aihara | |
| 6,611,635 B1* | 8/2003 | Yoshimura et al. ............ | 385/14 |
| 6,641,310 B2* | 11/2003 | Williams ........................ | 385/92 |
| 6,751,379 B2* | 6/2004 | Capewell et al. ............... | 385/36 |
| 7,118,293 B2 | 10/2006 | Nagasaka et al. | |
| 7,149,389 B2 | 12/2006 | Yoon et al. | |
| 7,245,643 B2* | 7/2007 | Nakae et al. .............. | 372/43.01 |
| 7,266,277 B2 | 9/2007 | Hamada | |
| 7,991,290 B2 | 8/2011 | Tanaka et al. | |
| 2001/0004413 A1* | 6/2001 | Aihara ............................ | 385/88 |
| 2003/0113077 A1* | 6/2003 | Xu et al. ......................... | 385/93 |
| 2003/0118343 A1* | 6/2003 | Ohe et al. ...................... | 398/139 |
| 2004/0175080 A1* | 9/2004 | Yamauchi et al. .............. | 385/93 |
| 2004/0202477 A1* | 10/2004 | Nagasaka et al. ............ | 398/138 |
| 2005/0089276 A1* | 4/2005 | Yoon et al. ..................... | 385/43 |
| 2005/0141823 A1* | 6/2005 | Han et al. ....................... | 385/89 |
| 2005/0259935 A1* | 11/2005 | Hamada ........................ | 385/129 |
| 2007/0140625 A1* | 6/2007 | Chen et al. ..................... | 385/88 |
| 2007/0146881 A1* | 6/2007 | Tanaka et al. ................. | 359/487 |
| 2009/0154872 A1* | 6/2009 | Sherrer et al. .................. | 385/14 |
| 2010/0265974 A1* | 10/2010 | Wang ....................... | 372/29.011 |
| 2010/0303405 A1* | 12/2010 | Tagami ........................... | 385/14 |
| 2012/0021525 A1* | 1/2012 | Fehr et al. ...................... | 436/94 |
| 2012/0263416 A1* | 10/2012 | Morioka ......................... | 385/33 |
| 2014/0161396 A1* | 6/2014 | Feng et al. ...................... | 385/83 |

FOREIGN PATENT DOCUMENTS

| | | |
|---|---|---|
| KR | 20070113651 A | 11/2007 |
| KR | 20090045656 A | 5/2009 |

OTHER PUBLICATIONS

International Search Report dated Mar. 19, 2012, regarding PCT/KR2011/006902.
International Report on Patentability and Written Opinion dated Mar. 19, 2012, regarding PCT/KR2011/006902.

* cited by examiner

[Fig. 1]
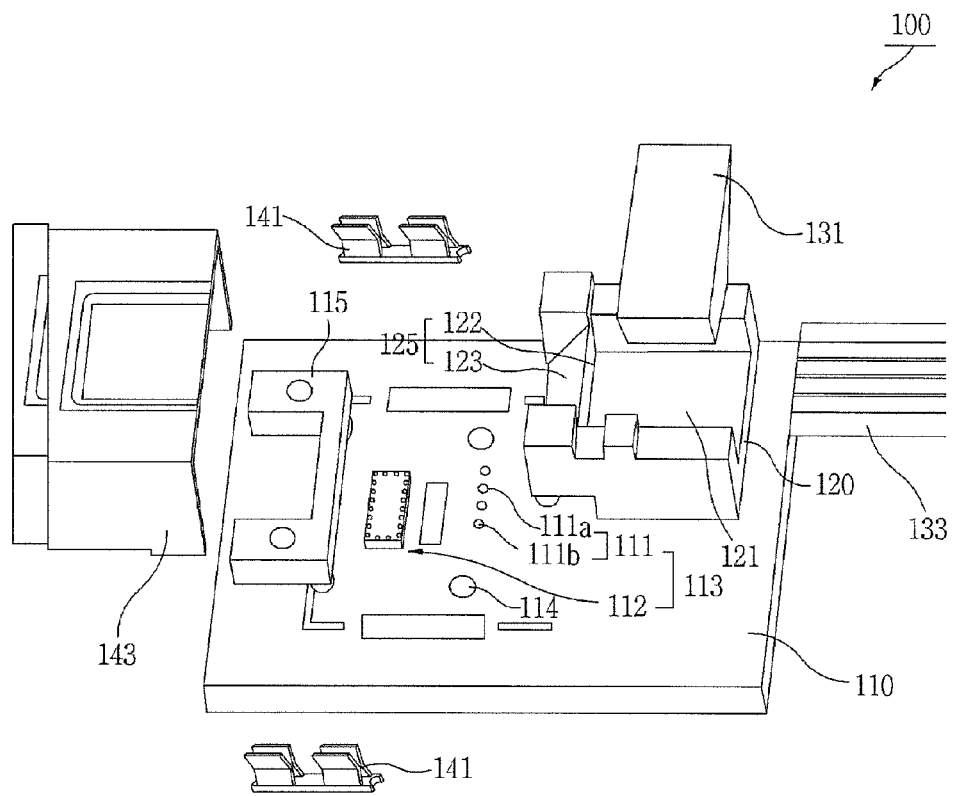

[Fig. 2]
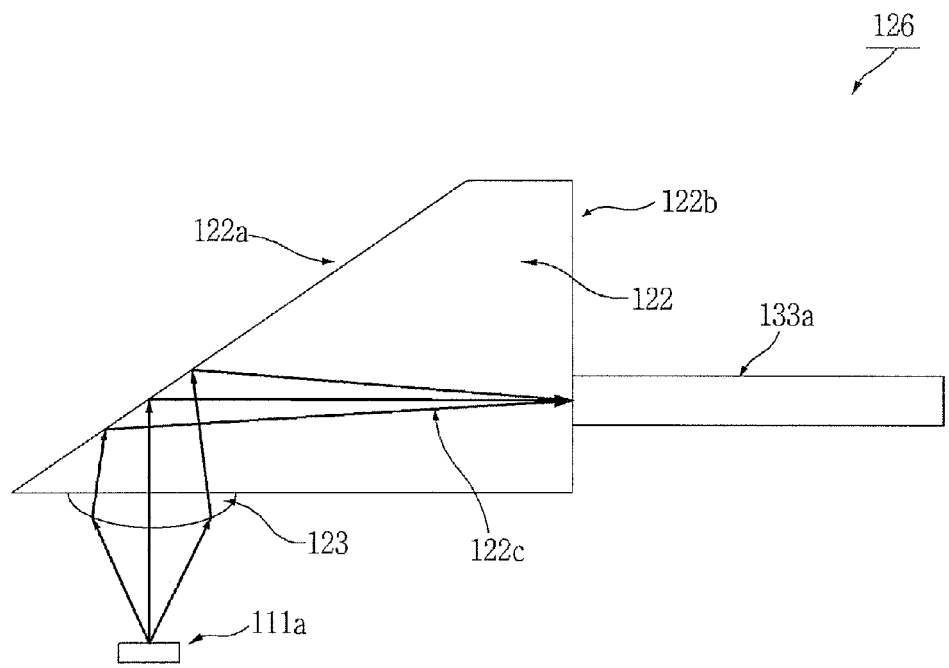
[Fig. 3a]
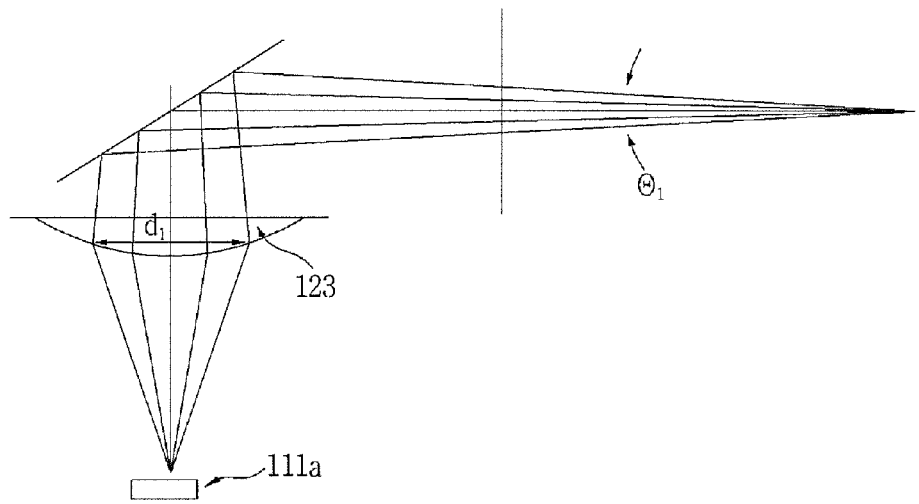

[Fig. 3b]
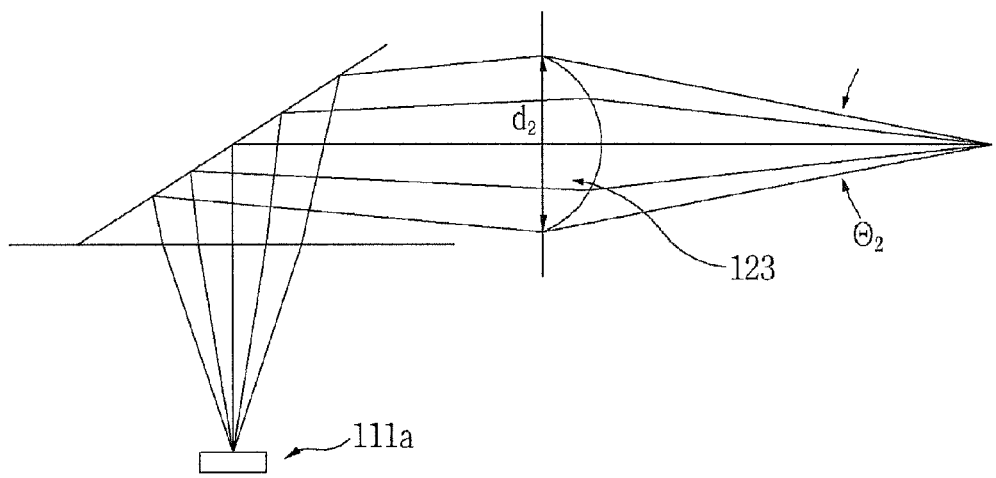
[Fig. 4]
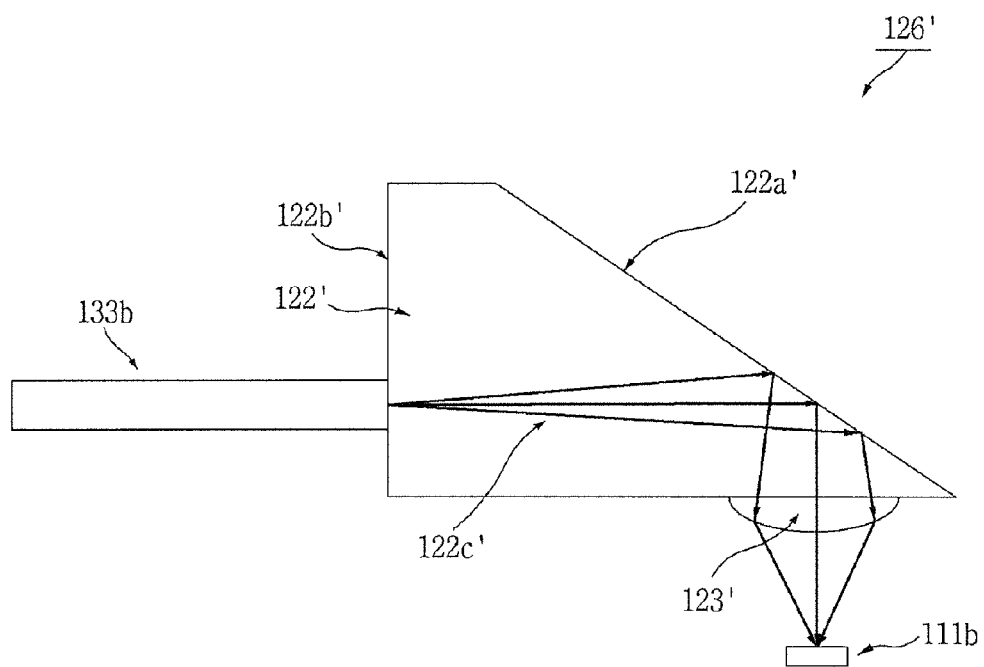

[Fig. 5]
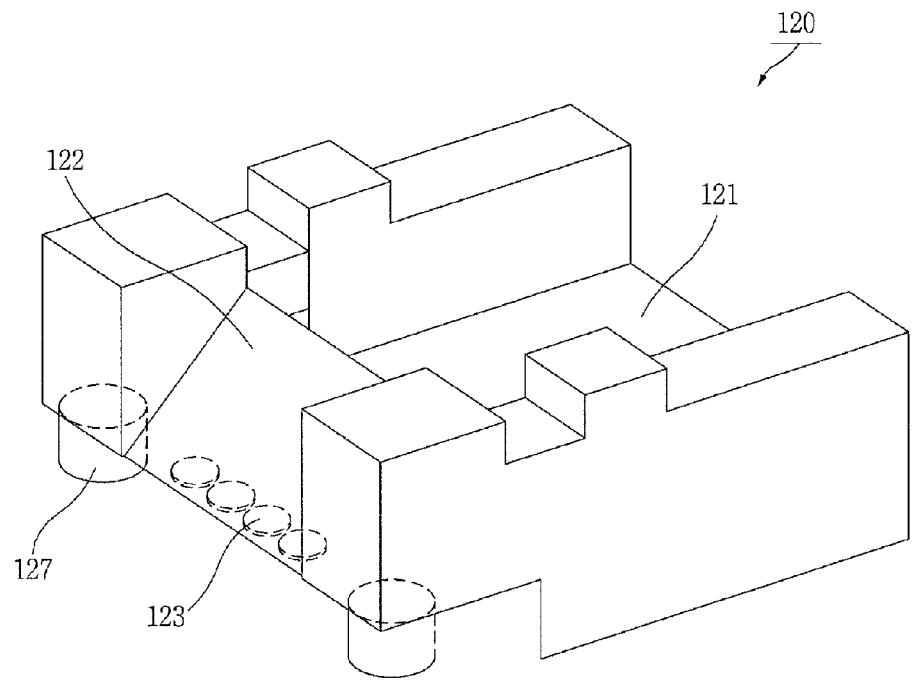
[Fig. 6]
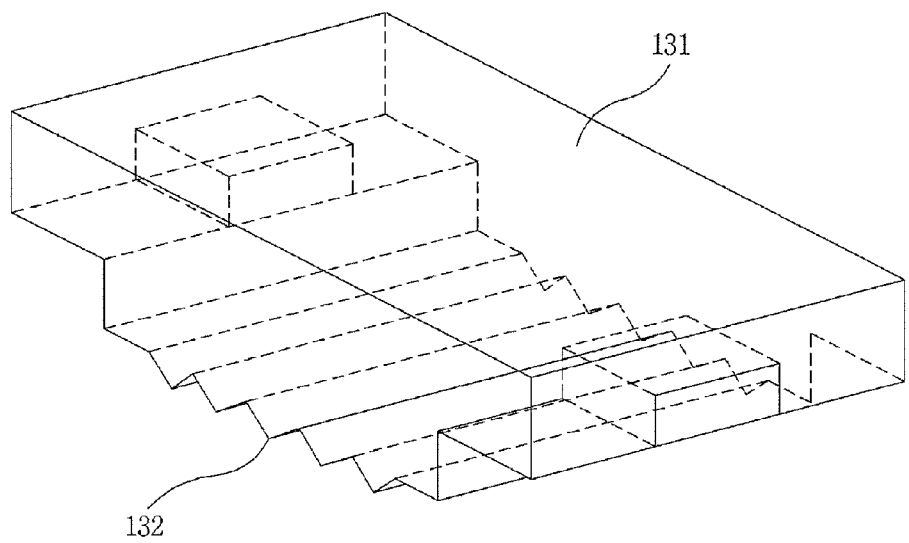

[Fig. 7]
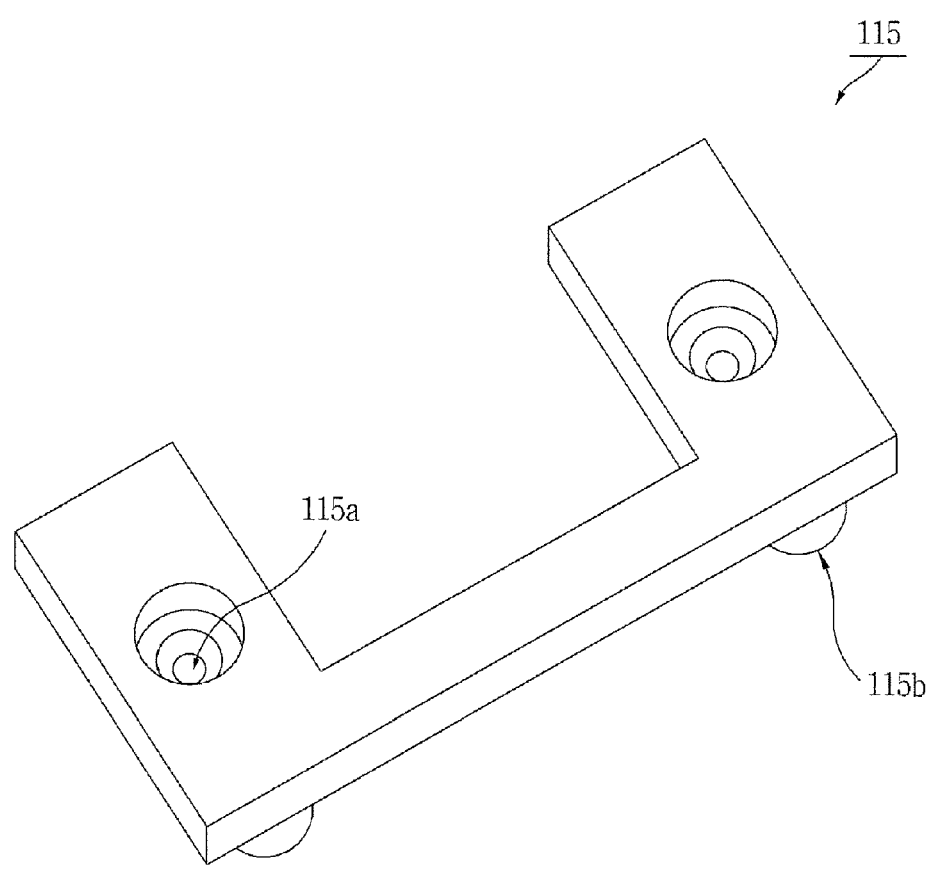

[Fig. 8]
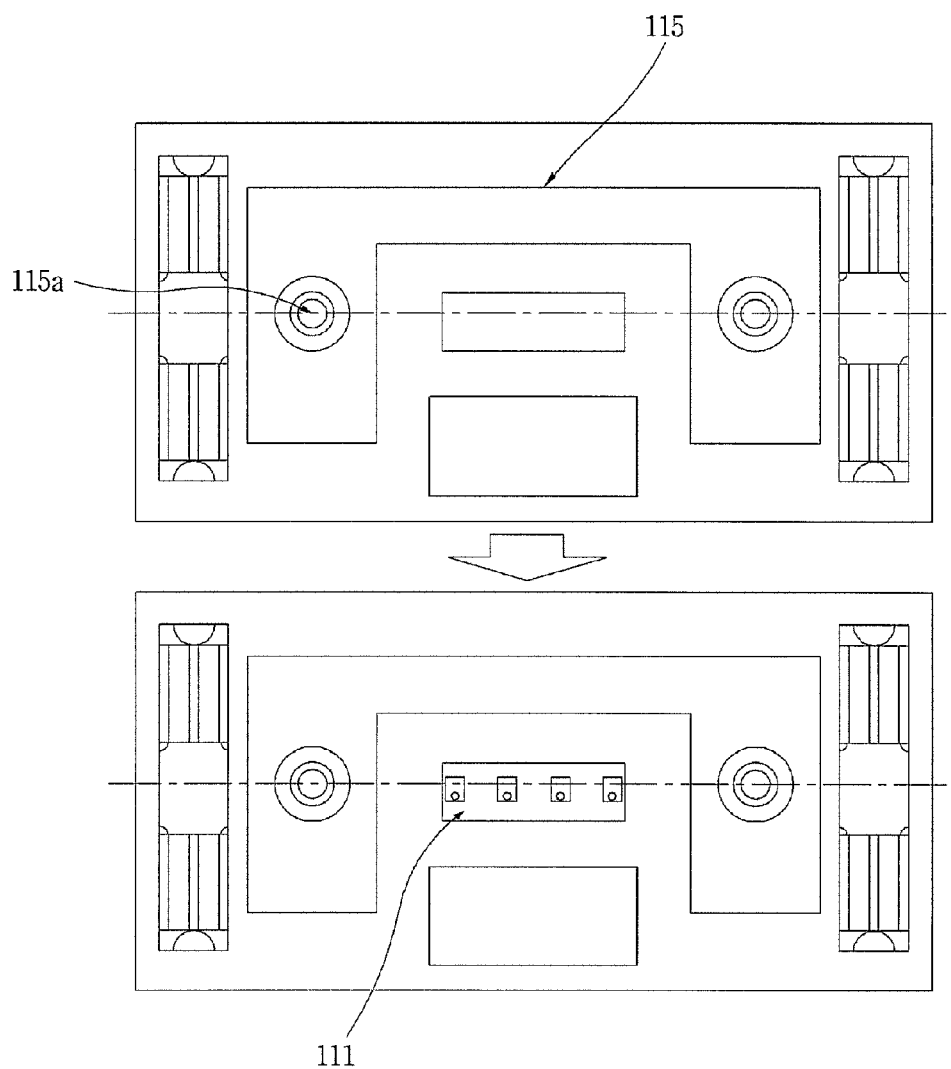

[Fig. 9]
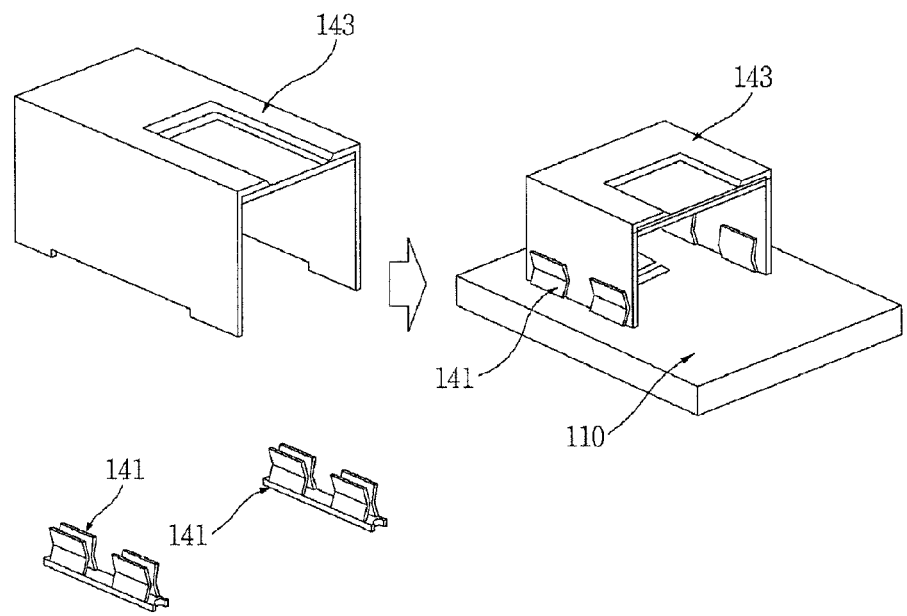
[Fig. 10a]
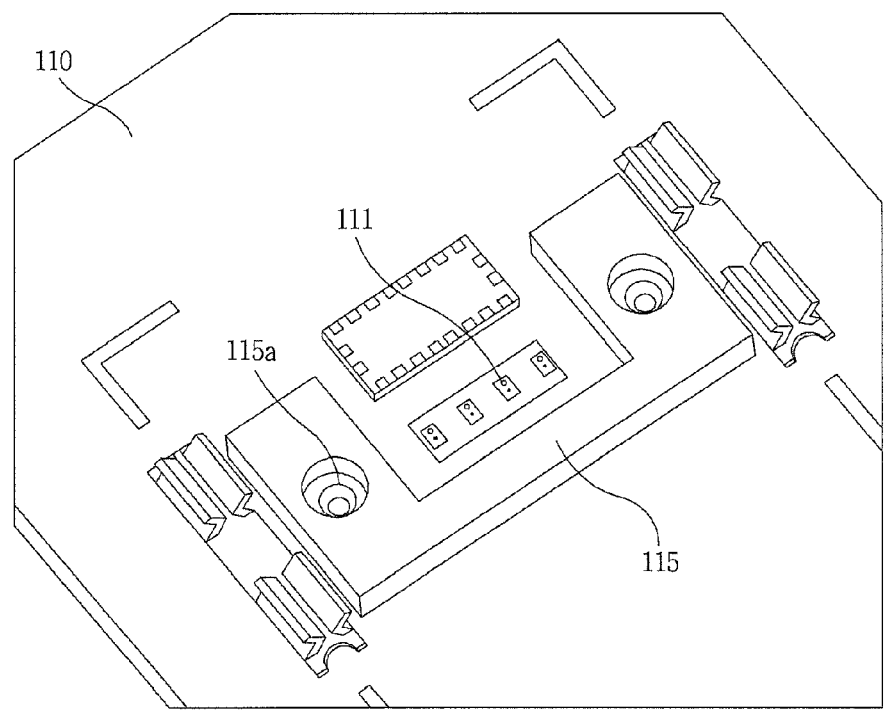

[Fig. 10b]
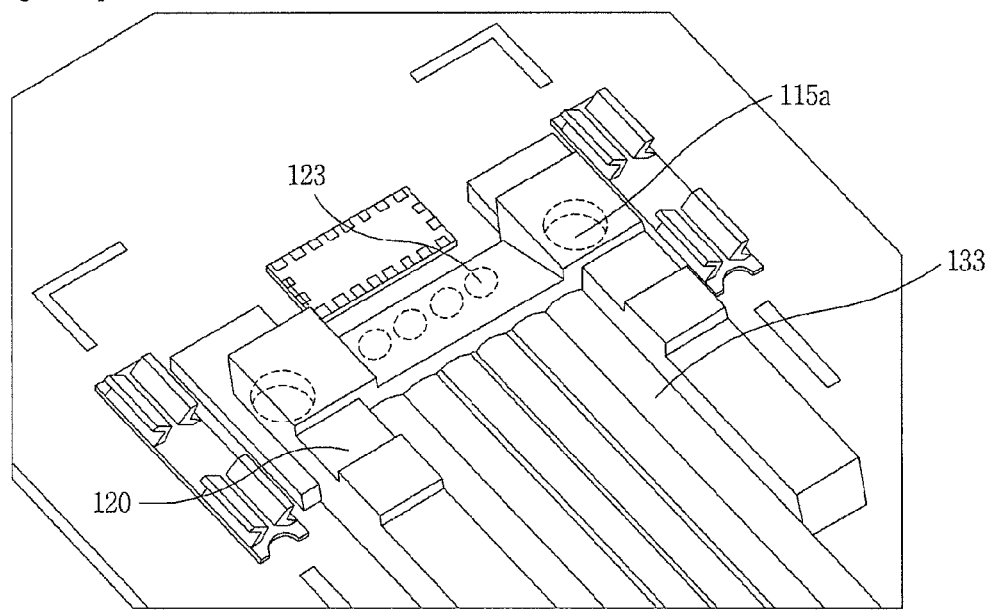
[Fig. 10c]
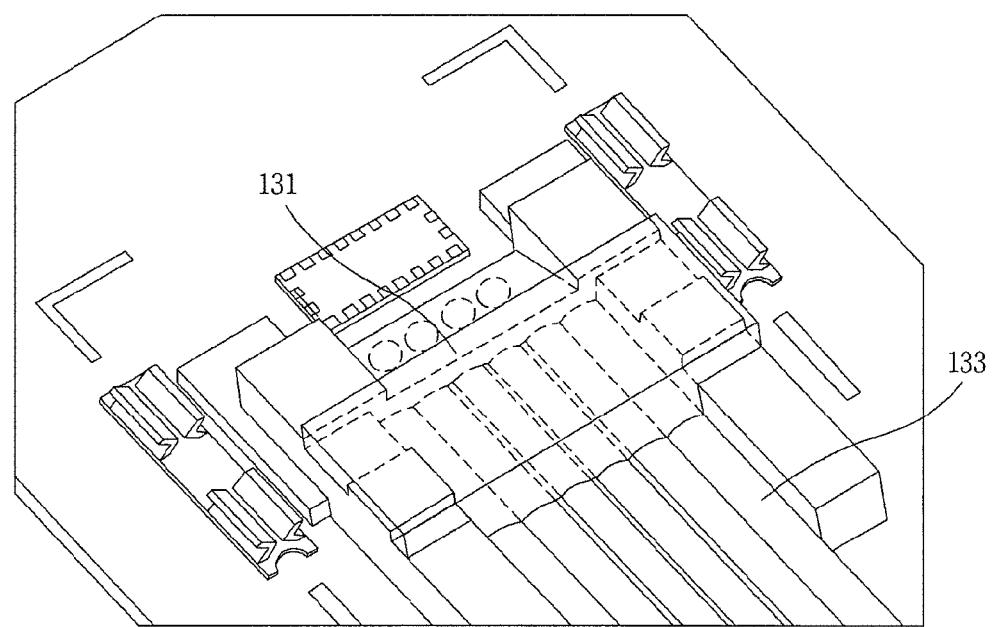

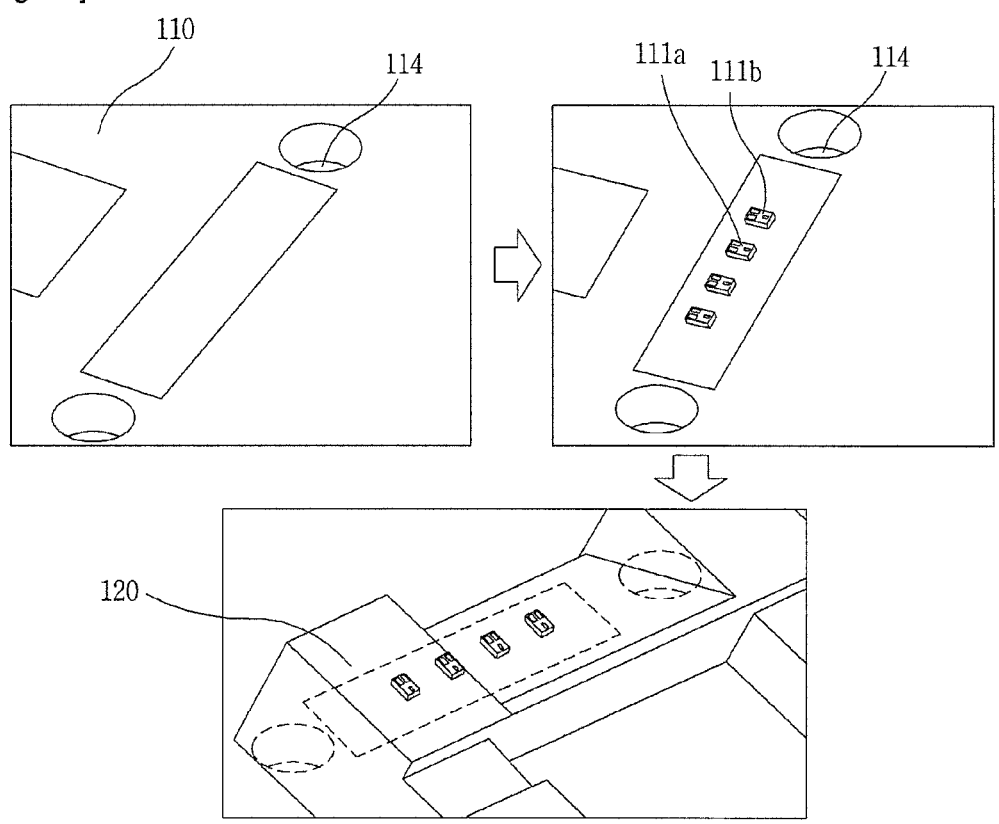
[Fig. 11]

OPTICAL TRANSMISSION AND RECEIVING DEVICE FOR IMPLEMENTING PASSIVE ALIGNMENT OF COMPONENTS AND METHOD FOR PASSIVELY ALIGNING COMPONENTS

CROSS-REFERENCE TO RELATED APPLICATIONS

This application is a division of U.S. patent application Ser. No. 14/788,547 filed Jun. 30, 2015, entitled "OPTICAL TRANSMISSION AND RECEIVING DEVICE FOR IMPLEMENTING PASSIVE ALIGNMENT OF COMPONENTS AND METHOD FOR PASSIVELY ALIGNING COMPONENTS," which in turn is a division of U.S. patent application Ser. No. 13/512,478 filed Feb. 6, 2013, entitled the same, which is a United States National Stage Application under 35 U.S.C. §371 of International Patent Application No. PCT/KR2011/006902, filed Sep. 19, 2011, entitled the same, which claims the benefit to Korean Patent Application No. 10-2010-0091614, filed Sep. 17, 2010, each of which is incorporated by reference into this application as if fully set forth herein.

TECHNICAL FIELD

The present invention relates to an optical device for implementing passive alignment of parts and a method therefor, more particularly to an optical device and a method therefor that utilize an alignment reference part arranged on the substrate to passively align an optical element part with a lens-optical fiber connection part.

BACKGROUND ART

Methods of signal transmission based on fiber optics, which are already widely used in long-distance communication, provide the advantages of broad bands and immunity to electromagnetic interference (EMI), and are thus being applied to high-capacity digital media transmissions, such as for high-definition digital video display devices, which require high-speed, high-density data transmissions.

In conventional methods of signal transmission based on fiber optics, however, the optical device for coupling the light-emitting elements with the optical fiber or for coupling the light emitted from the optical fiber with the light-receiving elements is not only very expensive but also quite difficult to use in performing optical alignment.

In particular, in a conventional method of optical alignment, the optical transmitter part is implemented by attaching light-emitting elements and light-receiving elements for sensing the optical outputs of the light-emitting elements, and by coupling a lens for collecting the optical signals from the light-emitting element. Then, the optical fiber is inserted, active optical alignment is performed with the optical fiber inserted, and the optical fiber is secured at an optimum position, to complete the optical alignment of the optical transmitter.

Active optical alignment refers to a method of optical alignment in which an electric current is applied to the light-emitting elements to emit optical signals, the optical signals thus emitted pass through the lens to produce an image at a particular distance, the optical fiber is aligned at this position, and, as the detected amount of optical signals entering the optical fiber varies according to the degree of alignment, the position is found at which the highest optical signal value is detected. This method is used in most alignment and packaging applications involving optical fibers and optical elements.

The optical receiver part includes aligning the optical fiber with the light-receiving element, and its assembly process is very similar to that of the optical transmitter part.

This method of active optical alignment, in which the light-emitting element or light-receiving element is driven directly and the degree of alignment with the optical fiber is sensed in real time to yield the optimum degree of alignment, requires a time-consuming manufacture process and expensive assembly apparatus.

Whereas the active optical alignment method involves manufacturing optical modules by laser welding while detecting optical outputs or optical currents in real time, the passive optical arrangement method is a method of alignment that does not require directly driving the optical elements and refers to technology for assembling based only on predetermined position information, to be highly beneficial in mass production.

An aspect of the present invention is to provide an optical device that includes optical modules of smaller and simpler structures and uses a minimal number of parts, so that the costs of the optical modules can be reduced, and the optical alignment can be performed passively for multiple channels in a simple manner.

Another aspect of the present invention is to provide a method of passively aligning the parts of an optical device that can minimize the alignment error, even when performing alignment for the light-emitting elements, light-receiving elements, lenses, and optical fibers of multiple channels using optical modules.

SUMMARY

To resolve the technical problems above, an aspect of the present invention provides an optical device 100 for passive alignment of parts that includes: a substrate 110; an optical element means 111 that includes light-emitting elements 111a and light-receiving elements 111b, mounted on the substrate 110; an optical fiber 133 for implementing optical communication with the optical element means 111; a lens-optical fiber connection means 120 for collecting light, altering an optical path, and securing and aligning the optical fiber 133; and an alignment reference means 115 arranged on the substrate 110 for passively aligning the optical element means 111 and the lens-optical fiber connection means 120.

Another aspect of the present invention provides a method for passive alignment of parts that includes: (a) coupling connection pillars 115b of an alignment reference means 115 to substrate holes 114; (b) aligning one or more light-emitting elements 111a and one or more light-receiving elements 111b in a row in a particular interval with respect to alignment holes 115a arranged opposite each other in the alignment reference means 115; (c) aligning a lens-optical fiber connection means 120 with respect to the aligning holes 115a; and (d) aligning an optical fiber 133 with an optical alignment point at a surface 122b of a prism forming a portion of the lens-optical fiber connection means 120.

According to the present invention, the optical fiber 133a is aligned in close contact with a surface 122b of the prism 122, so that there is no additional structure required for aligning the optical fiber 133a, and the amount of reflection loss can be reduced at the reflective surface 122b by index matching epoxy.

Also, the lens-optical fiber connection part 120 includes a focusing lens 123 for collecting and guiding the light, a prism 122 which alters the traveling direction of the light, and an optical fiber connector 121 which secures and aligns the optical fiber 133, formed in a single structure, so that the number of parts may be reduced.

Thus, the present invention provides the advantages of simplifying passive optical alignment for multiple channels, so as to minimize alignment error, and of reducing and simplifying the structure of the optical modules and minimizing the number of parts used, so as to lower the costs of the optical modules.

Since it is not necessary to apply large, complicated precision equipment for the optical alignment, the time required for the optical alignment can be reduced, and accurate alignment is guaranteed every time, providing benefits in terms of efficiency and convenience.

In addition, the present invention makes it possible to mass produce bi-directional optical devices that are simple both in structure and assembly method, so that data communication speeds at home or at the office can be improved with low costs, laying the foundations for greater advances in the Internet.

DESCRIPTION OF THE DRAWINGS

FIG. 1 illustrates the constitution of an optical device according to the present invention.

FIG. 2 illustrates the constitution of the lens part and the optical paths in an optical transmitter according to the present invention.

FIG. 3a illustrates the constitution of the lens part for an example in which the focusing lens is arranged close to the light-emitting element in an optical transmitter according to the present invention.

FIG. 3b illustrates the constitution of the lens part for an example in which the focusing lens is arranged far away from the light-emitting element in an optical transmitter according to the present invention.

FIG. 4 illustrates the constitution of the lens part and the optical paths in an optical receiver according to the present invention.

FIG. 5 is a detailed illustration of the constitution of a lens-optical fiber connection part according to the present invention.

FIG. 6 is a detailed illustration of the constitution of an optical fiber pin according to the present invention.

FIG. 7 is a detailed illustration of the constitution of an alignment reference part according to the present invention.

FIG. 8 is an illustration for describing a method of aligning light-emitting elements and light-receiving elements using an alignment reference part according to the present invention.

FIG. 9 illustrates a metal case and case securing pins when they are detached and when they are coupled according to the present invention.

FIG. 10a is an illustration for describing a method of aligning light-emitting elements and light-receiving elements on a substrate.

FIG. 10b illustrates the lens-optical fiber connection part and the optical fiber coupled together according to the present invention.

FIG. 10c illustrates a module in which an optical fiber pin is coupled to the optical fiber to secure the optical fiber according to the present invention.

FIG. 11 illustrates a method of aligning parts with respect to holes in the substrate without using an alignment reference part, according to another embodiment of the present invention.

DESCRIPTION OF THE NUMERALS

The following is a listing the features of the optical device according to the present invention.

110: substrate
111: optical element part
111a: light-emitting element
111b: light-receiving element
113: photoelectric converter part
114: substrate hole
115: alignment reference part
120: lens-optical fiber connection part
121: optical fiber connector
122: prism
123: focusing lens
125: lens part
126: optical fiber connector
131: optical fiber pin
133: optical fiber
141: case securing pin
143: metal case

DETAILED DESCRIPTION

Specific embodiments of the present invention are described below with reference to the accompanying drawings.

FIG. 1 illustrates the constitution of an optical device according to the present invention.

Referring to FIG. 1, an optical device 100 of the present invention includes a substrate 110, an optical element part 111 that includes light-emitting elements 111a and light-receiving elements 111b, a driver circuit 112, a photoelectric converter part 113 that includes the optical element part and the driver circuit 112, substrate holes 114, an alignment reference part 115 arranged on the substrate 110 for passively aligning the optical element part 111 and the lens-optical fiber connection part 120, a lens-optical fiber connection part 120 for collecting light, altering the optical path, and securing and aligning the optical fiber 133, an optical fiber pin 131 connected to one end of the lens-optical fiber connection part 120, an optical fiber 133 for implementing optical communication with the optical element part 111, case securing pins 141, and a metal case 143.

The driver circuit 112 is installed on the substrate 110, and the optical element part 111 is mounted on an upper portion of the substrate 110. The substrate holes 114 include two holes into which two connection pillars 115b on the alignment reference part 115 may be press fitted for connection.

For the optical fiber 133, a multi-channel ribbon optical fiber is used, which includes one or more optical fibers in an integrated form.

The lens-optical fiber connection part 120 includes a focusing lens 123 for collecting and guiding the light and a prism 122 that alters the light's traveling direction, and includes an optical fiber connector 121 that secures and aligns the optical fiber 133, all of which are formed as a single structure.

A detailed description is provided below, with reference to the drawings, on the constitution of the lens part 125 and its operating principles according to the present invention.

FIG. 2 illustrates the constitution of the lens part and the optical paths in an optical transmitter according to the present invention.

Referring to FIG. 2, the transmitter optical part 126 of the present invention includes a light-emitting element 111a, a focusing lens 123, a prism 122, and a transmitter-part optical fiber 133a.

The lens part 125 can be used for either the optical transmitter or the optical receiver, and one or more focusing lens 123 can be used.

The light 122c emitted from a light-emitting element 111a is collected after it passes through the focusing lens 123, where the collection involves altering the optical path of the transmitter-part beam 122c by way of total reflection at the reflective surface 122a of the transmitter-part prism for coupling to the transmitter-part optical fiber 133a.

The transmitter-part optical fiber 133a is aligned such that it is in close contact with a surface 122b of the prism, thus providing the advantage that no additional structure is needed for aligning the optical fiber.

Also, if the securing includes the use of an epoxy adhesive having a similar refractive index between the transmitter-part optical fiber 133a and the surface 122b of the prism, the layer of air is eliminated, so that the aligning of the optical fiber is made simpler, and the reflection loss occurring at the reflective surface can be reduced.

The size of the transmitter optical part 126 can be reduced by installing the focusing lens 123 on a lower surface of the prism 122 in the direction in which the light-emitting element 111a emits light and thereby decreasing the size for the guiding of the light.

The light 122c incident on the transmitter-part optical fiber 133a has to have an incident angle smaller than or equal to the NA (numerical aperture), in order to couple with the transmitter-part optical fiber 133a. Thus, a smaller traveling angle at which the light 122c is incident on the transmitter-part optical fiber 133a provides a greater optical coupling efficiency in coupling with the transmitter-part optical fiber 133a.

Therefore, in order to enhance the optical coupling efficiency at the transmitter-part optical fiber 133a, the focusing lens 123 is installed at a position close to the light-emitting element 111a, as this can decrease the incident angle of the light 122c on the transmitter-part optical fiber 133a.

FIG. 3a and FIG. 3b illustrate the constitution of the lens part for examples in which the focusing lens is arranged close to the light-emitting element 111a and far away from the light-emitting element 111a, respectively.

Referring to FIG. 3a and FIG. 3b, the cases are compared in which the focusing lens 123 is close to and far away from the light-emitting element 111a under otherwise identical conditions, and the comparison shows that the case in which the focusing lens 123 is close to the light-emitting element 111a provides a reduction in the light's maximum diameter by 1.5 times (d1<d2) and a reduction in maximum angle by 2.5 times ($\theta_1 < \theta_2$), over the case in which the focusing lens is far away.

Thus, it can be seen that it is more advantageous, in terms of efficiency in optical coupling with the transmitter-part optical fiber 133a, to arrange the focusing lens 123 close to the light-emitting element 111a, i.e. at a position where the light emitted from the light-emitting element 111a is directly received primarily, rather than to arrange the focusing lens 123 far away, i.e. at a position where the light emitted from the light-emitting element 111a is received secondarily after it passes through the prism.

FIG. 4 illustrates the constitution of the lens part and the optical paths in an optical receiver according to the present invention.

Referring to FIG. 4, the receiver optical part 126' of the present invention includes a light-receiving element 111b, a focusing lens 123', a prism 122', and a receiver-part optical fiber 133b.

The light 122c' transferred through the receiver-part optical fiber 133b is emitted, passed through the prism 122', totally reflected at the receiver-part prism's reflective surface 122a' to alter the optical path, passed through the focusing lens 123', and collected, to be coupled with the light-receiving element 111b.

Referring to FIG. 3 and FIG. 4, the transmitter-part and receiver-part optical fibers 133 of the present invention are aligned to be in close contact with a surface 122 of the prism, so that no additional structure is required when aligning the optical fibers 133. Another advantage is that, if the securing includes the use of an epoxy adhesive having a similar refractive index between the optical fiber 133 and the surface 122 of the prism, the layer of air is eliminated, so that the aligning of the optical fiber is made simpler, and the reflection loss occurring at the reflective surface can be reduced.

A detailed description is provided below, with reference to the drawings, on the constitution and operation of the lens-optical fiber connection part 120 according to the present invention.

FIG. 5 is a detailed illustration of the constitution of a lens-optical fiber connection part according to the present invention.

Referring to FIG. 5, the lens-optical fiber connection part 120 of the present invention includes a focusing lens 123 for collecting and guiding the light, a prism 122 for altering the traveling direction of the light, and an optical fiber connector 121 for securing and aligning the optical fiber 133, all of which are formed as a single structure, so that the number of parts may be reduced.

Alignment pillars 127 on the lens-optical fiber connection part 120 passively couple with the alignment reference part 115 to implement optical alignment between the light-emitting element 111a and light-receiving elements 111b and the optical fiber 133.

A description is provided below on a method of constituting and securing optical fiber pins according to the present invention.

FIG. 6 is a detailed illustration of the constitution of an optical fiber pin according to the present invention. Referring to FIG. 6, the optical fiber pin 131 of the present invention includes "V"-shaped grooves 132 to secure the optical fiber 133 at the accurate position.

Although an optical fiber pin 131 is used for the present invention that includes grooves 132 shaped as a "V," it is obvious that the present invention is not thus limited, and various modifications can be employed.

A detailed description is provided below, with reference to the drawings, on the constitution of the alignment reference part 115 and the method of aligning parts using the alignment reference part 115 according to the present invention.

FIG. 7 is a detailed illustration of the constitution of an alignment reference part according to the present invention.

Referring to FIG. 7, the alignment reference part 115 of the present invention includes alignment holes 115a, shaped as circular indentations, and connection pillars 115b, for connecting to the substrate holes 114.

The alignment reference part 115 has its upper surface and lower surface bent with respect to the body to form a substantially "⊏" rectangular receptacle shape, and includes two alignment holes 115a, which are used as alignment reference points, and two connection pillars 115b.

FIG. 8 is an illustration for describing a method of aligning light-emitting elements and light-receiving elements using an alignment reference part according to the present invention.

Referring to FIG. 7 and FIG. 8, a method of aligning parts according to the present invention includes, first, securing the connection pillars 115b in the holes 114 of the substrate, and then passively aligning the light-emitting elements 111a and the light-receiving elements 111b in a row, with respect to the two alignment holes 115a in the alignment reference part 115.

Next, after passively coupling the two alignment holes 115a of the alignment reference part 115 with the alignment pillars 127 of the lens-optical fiber connection part 120, optical alignment is performed such that the lens part 125 and the light-emitting elements 111a and light-receiving elements 111b are aligned in a row.

In this way, the present invention can easily align optical elements in their desired positions by passive alignment.

A detailed description is provided below, with reference to the drawings, on the method of securing parts by way of a metal case 143 and case securing pins 141 according to the present invention.

FIG. 9 illustrates a metal case and case securing pins when they are detached and when they are coupled according to the present invention.

Referring to FIG. 9, the metal case 143 encloses the light-emitting elements 111a, light-receiving elements 111b, and driver circuit to protect them from the external environment, and also presses on the optical fiber pin 131 to firmly secure the optical fiber.

The case securing pins 141 are coupled to the substrate 110 by surface mount technology (SMT) to firmly couple the substrate 110 with the metal case 143.

A sequence of processes for passively aligning the parts of an optical device according to the present invention can be summarized as follows.

As a first step, the connection pillars 115b of the alignment reference part 115 are coupled to the holes 114 of the substrate.

In the second step, the light-emitting elements 111a and light-receiving elements 111b are aligned in a row in particular intervals, with respect to the two alignment holes 115a of the alignment reference part 115.

In the third step, the lens-optical fiber connection part 120 is aligned with respect to the two alignment holes 115a, which are arranged opposite each other in the alignment reference part 115.

In the fourth step, the optical fiber 133 is aligned with the optical alignment point set at a surface 122b of the prism forming a portion of the lens-optical fiber connection part 120.

In the fifth step, the optical fiber 133 is secured with the optical fiber pin 131, after which the metal case 143 is covered and coupled with the case securing pins 141.

A description is provided below on a method of implementing the first through fourth steps above, with reference to FIGS. 10a to 10c.

FIG. 10a is an illustration for describing a method of aligning light-emitting elements and light-receiving elements on a substrate.

FIG. 10a shows the alignment reference part 115 and the substrate 110 coupled together, by the coupling of the two substrate holes 114 with the two connection pillars 115b of the alignment reference part 115.

Here, since the light-emitting elements 111a and the light-receiving elements 111b are aligned in particular intervals with respect to a line connecting the centers of the two alignment holes 115a in the alignment reference part 115 coupled to the substrate 110, any errors which may occur from the coupling of the alignment reference part 115 can be ignored.

FIG. 10b illustrates the lens-optical fiber connection part and the optical fibers coupled together according to the present invention.

The lens-optical fiber connection part 120 is aligned with respect to each of the two circular alignment holes 115a of the alignment reference part 115.

Here, the alignment holes 115a of the alignment reference part 115 are used as alignment points for the light-emitting elements 111a and light-receiving elements 111b, as well as alignments for the lens-optical fiber connection part 120.

Also, according to the present invention, optical alignment with the focusing lens 123 is implemented by pressing the optical fiber pin 131 to passively couple the optical fiber 133 with the lens-optical fiber connection part 120.

FIG. 10c illustrates a module in which an optical fiber pin is coupled to the lens-optical fiber connection part and the optical fiber to secure the optical fibers according to the present invention.

FIG. 10c shows the optical fiber 133 secured in position by passively aligning the optical fiber pin 131.

FIG. 11 illustrates a method of aligning parts with respect to holes in the substrate without using an alignment reference part, according to another embodiment of the present invention.

Referring to FIG. 11, a method of aligning parts according to another embodiment includes a first step of aligning the light-emitting elements 111a and the light-receiving elements 111b in particular intervals on the substrate 110 with the holes 114 of the substrate as alignment points, a second step of aligning the lens-optical fiber connection part 120 with the holes 114 of the substrate as alignment points, and a third step of aligning the optical fiber 133 with the optical fiber connector 121 to complete the optical alignment.

With this method, the substrate holes 114 are used as reference for the optical alignment, so that the alignment reference part 115 for optical alignment can be removed, and the number of parts can be reduced.

The major component parts included in the optical device of the present invention described above can be fabricated by injection molding, and since the parts of the focusing lens 123 and the prism 122 have to transmit light, these can be made by injection molding from a transparent material.

While the description above is provided mainly using the example of an optical device, the same may apply to any one of an optical transmitter, an optical receiver, and an optical transceiver.

While the technical spirit of the present invention has been described above with reference to the accompanying drawings, the description is intended only to provide preferred examples of the present invention and is not intended to limit the present invention. Also, it is an apparent fact that any person having ordinary skill in the field of art to which the present invention pertains can modify or copy the technical spirit in various ways without departing from the scope of the present invention.

The invention claimed is:

1. A method for passive alignment of parts on a substrate, the method comprising:

aligning one or more light-emitting elements and one or more light-receiving elements in a row in a particular interval with an alignment point at substrate holes;

aligning a lens-optical fiber connection part with the alignment point at the substrate holes, the lens-optical fiber connection part comprising an optical fiber connector; and aligning the optical fiber with an optical fiber connector;

wherein the lens-optical fiber connection part comprises alignment pillars for passive coupling with an alignment reference part to implement optical alignment between the one or more light-emitting elements and the optical fiber and wherein an upper surface and a lower surface of the alignment reference part are bent with respect to a body of the alignment reference part to form a substantially rectangular receptacle shape.

2. The method according to claim 1, wherein the one or more light-emitting elements and the one or more light-receiving elements are mounted parallel to the substrate by way of surface mount technology (SMT).

3. The method according to claim 1, wherein the optical fiber is part of a multi-channel ribbon of integrated optical fibers.

4. The method according to claim 1, further comprising: securing a driver circuit to the substrate.

5. The method according to claim 1, wherein the lens optical-fiber connection part comprises a focusing lens configured to alter a path of light received from the one or more light-emitting elements.

6. The method according to claim 5, wherein the lens-optical fiber connection part comprises a prism configured to alter a traveling direction of light, the method further comprising:

installing the focusing lens on a lower surface of the prism in a direction in which the one or more light-emitting elements emits the light.

7. The method according to claim 5, further comprising: installing the focusing lens at a position proximate to the one or more light-emitting elements such that light emitted therefrom is received directly by the focusing lens.

8. The method according to claim 6, wherein the optical fiber is aligned in direct contact with a surface of the prism.

9. The method according to claim 6, further comprising: aligning the optical fiber with the alignment point at the surface of a prism using an epoxy adhesive having a similar refractive index between the optical fiber and the surface of the prism.

10. The method according to claim 1, wherein the optical fiber connector comprises a part of the lens optical-fiber connection part and is configured to secure and connect the optical fiber.

11. The method according to claim 1, wherein the optical fiber comprises a transmit optical fiber, and the light incident on the transmit optical fiber is less than or equal to a numerical aperture associated therewith.

12. The method according to claim 1, further comprising: coupling an optical fiber pin to an end of the lens-optical fiber connection part for securing the optical fiber.

13. The method according to claim 12, wherein the optical fiber pin includes substantially V-shaped grooves for securing the optical fiber.

14. The method according to claim 1, further comprising enclosing at least a portion of the one or more light-emitting elements with a metal case.

* * * * *